No. 774,565. PATENTED NOV. 8, 1904.
W. H. COOLEY.
PHOTOGRAPHIC CAMERA.
APPLICATION FILED MAR. 26, 1904.
NO MODEL. 5 SHEETS—SHEET 2.

WITNESSES:
INVENTOR:

No. 774,565. PATENTED NOV. 8, 1904.
W. H. COOLEY.
PHOTOGRAPHIC CAMERA.
APPLICATION FILED MAR. 26, 1904.
NO MODEL. 5 SHEETS—SHEET 3.

WITNESSES: Osborne F. Gurney. Clara M. Lierner.
INVENTOR: Wm. H. Cooley.

No. 774,565. PATENTED NOV. 8, 1904.
W. H. COOLEY.
PHOTOGRAPHIC CAMERA.
APPLICATION FILED MAR. 26, 1904.

NO MODEL. 5 SHEETS—SHEET 4.

WITNESSES:
Osborne F. Gurney.
Clara Siener.

INVENTOR:
Wm. H. Cooley.

No. 774,565.

Patented November 8, 1904.

UNITED STATES PATENT OFFICE.

WILLIAM H. COOLEY, OF BROCKPORT, NEW YORK.

PHOTOGRAPHIC CAMERA.

SPECIFICATION forming part of Letters Patent No. 774,565, dated November 8, 1904.

Application filed March 26, 1904. Serial No. 200,104. (No model.)

*To all whom it may concern:*

Be it known that I, WILLIAM H. COOLEY, a citizen of the United States, residing at Brockport, in the county of Monroe and State of New York, have invented a new and useful Improvement in Photographic Cameras, of which the following is a specification.

The object of my invention is to cheapen the construction of folding view-cameras, while at the same time securing a greater degree of rigidity for the lens-carriage of such a camera when opened out in position for use.

View-cameras as usually constructed consist of two or more sections of bed hinged together, with one of such sections, and preferably the central section when there are three, just long enough to contain the two principal elements of the camera—viz., the camera-box and the lens-carriage—when in their closed or folded-up positions. This implies, then, that the feet or support for the two elements of the camera, camera-box, and lens-carriage shall either be arranged to overlap each other or else their combined length must not exceed the length of the central section of the bed. To make their combined length equal to that of the central section of the bed implies that the central bed-section must either be very long or else the length of the bearings which the feet obtain upon the camera-bed must be so short that the camera element will not be supported with that degree of rigidity necessary for good camera-work. These difficulties may be overcome and a satisfactory construction secured by arranging such a support for the feet, and so conforming the feet themselves that those supporting the lens-carriage may overlap those for supporting the camera-box when such camera elements are brought close together. One method of securing this result is to form a double groove in each outer edge of the camera-bed and to have the feet on the lens-carriage slide in the upper pair of grooves and to have the feet on the camera-body slide on the lower pair of grooves. A difficulty of this construction is that the wood left between and on each side of the grooves must be quite narrow, and the grooves themselves must also be quite narrow. The wood, then, that is left between the grooves is easily split out; so, also, is the strip of wood on the outside of either groove. For these reasons I have preferred to make use of a single groove and with feet on the camera-box arranged to slide in such groove and with guiding-feet also on the lens-carriage arranged to slide in such groove and held in proper relation thereto and therein by means of an extension thereon arranged to grasp or engage the upper or lower, and preferably the upper, surface of the bed itself and in that way inclose the upper lip lying on the upper edge of the groove in the bed.

In cameras of moderate focal length or draw a little play to the lens-carriage—that is, a little looseness permitting a slight spring to and fro from the vertical—may be permitted and may be readily compensated for by the rise and fall of the lens-board; but in cameras of great focal length or draw any reasonable amount of rise and fall to the lens-board will not sufficiently compensate for this difficulty to maintain the axis of the lens at practically the central point of the ground glass or sensitive plate. For overcoming this difficulty, then, I have provided a construction in which the length of the foot or support for the lens-carriage may be even greater than the length of the central section of the bed, in which case it will of course be understood that the supporting-foot for the lens-carriage must be arranged to open and close in such a way as when the camera is folded up to occupy no more space than the circumstances will readily permit of. This construction consists, then, in a series of connecting-pieces articulating with the lens-carriage and with guide-pieces arranged to slide upon the bed and with each other in such a way as to maintain such lens-carriage always in a vertical position regardless of the extent to which the supporting parts of such lens-carriage have been opened out. In its essential features, then, this last construction consists in that modification of the first-named construction which would result from severing or dividing the supporting-foot on each side of the lens-carriage and in so connecting one of such pieces to the lens-carriage that it may slide outwardly on the bed and away from the lens-carriage, while for any position within the range of this permissible motion such lens-carriage will be maintained at all times in its vertical position.

My invention comprises then, broadly, such a conformation and arrangement of guide-plates on each of the two camera elements relatively to each other and to a guideway on the bed of the camera that a guide-plate on each of such elements shall be guided on such guideway in a practically fixed path and that a guide-plate on one of such elements can pass by or overlap a guide-plate on the other one of such elements on the same guideway therewith when such elements are brought close together. It is of course immaterial whether such a guideway on the camera-bed constitutes a projecting tongue or ridge thereon or a groove or channel therein.

My invention also comprises a guiding mechanism for one of the elements of a photographic camera constructed in two parts with such connections between them and the camera element which they are arranged to support that the parts of each guide-plate may be moved relatively toward or from each other, so as to shorten or lengthen the base-line of their support on such guideway for such camera element, while at the same time maintaining a practically fixed angular relation between such camera element and the guideway on the camera-bed on which such guide-plates are arranged to work.

In folding view-cameras as usually heretofore constructed, and especially of the larger sizes, I have found that the permissible vertical depth of the bed for such a camera is such that when the camera is opened out and the lens-carriage and camera-box moved to the greatest distance apart, or nearly so, the bed has not a sufficient degree of rigidity to hold the parts steady, so as to secure good results. To overcome this difficulty, I have provided strengthening or stiffening pieces hinged to the several parts of the bed and arranged to fold up against the under side of the bed when out of use and arranged also to open downwardly, so as to lie in planes practically at right angles with the bed and be held there and secured to each other so as to greatly stiffen the bed of the camera and firmly hold the parts of the camera against vibration, which is very apt to occur in the usual constructions. Again, in the use of folding view-cameras as usually constructed and of the larger sizes it oftentimes happens that the lens and its tube are of sufficient weight to spring the joints of the bed so far as to throw the focus of the lens outside of the range of the desired focal center on the ground-glass plate. These difficulties are overcome by the construction herein shown and described.

My invention, then, comprises also a series of stiffening or bracing pieces arranged when in their operative positions to be connected to the several sections of the camera-bed and to lie in a plane or planes at right angles with the plane of the bed of the camera, or nearly so, such stiffening or bracing pieces preferably hinged one to each of the several sections of the camera-bed and arranged when out of use to be folded up, so as to lie in planes parallel, or nearly, so with the several sections of the bed of the camera to which they are attached.

The accompanying drawings illustrate my invention as embodied in a view-camera having a sectional and folding bed and show only so much of the camera as is necessary to illustrate my invention. The camera parts are shown in some instances only in diagram.

The drawings are as follows: Fig. 2 shows the same camera with the lens-carriage and camera-box brought close together, so as to permit of the folding up of the forward section of the bed when desired. Fig. 3 is a vertical sectional view of the lower right-hand portion of the camera, taken through the center of the shaft or rod $e$, but shows such rod and also the pinion and operating-heads on such rod in full. Fig. 4 is a view of the foot-piece P on the side of the lens-carriage toward the observer, as seen in Fig. 1, and with such foot-piece straightened out and shown as it appears when it comes from the cutting-die and before being bent up, while Fig. 5 is a view from the rear or from the left, as seen in Fig. 1, of such foot-piece P detached from the lens-carriage. Figs. 6 and 7 are views similar to Figs. 1 and 2 of a modified form of my invention, while Fig. 12 shows the lower portion only of a camera with the camera-box and lens-carriage brought close together and with such elements supported and guided by means of guide-plates such as seen in Figs. 9 and 10, while Fig. 16 shows a portion of a camera-bed with guide-plates thereon and partly overlapping each other, such as seen in Figs. 14 and 15, while

Similar letters refer to similar parts throughout the several views.

In the following specifications I will describe first those features of my present invention more especially adapted to secure the rigidity of the camera elements in their adjustments on the bed in connection with the greatest possible degree of compactness.

Figure 1:
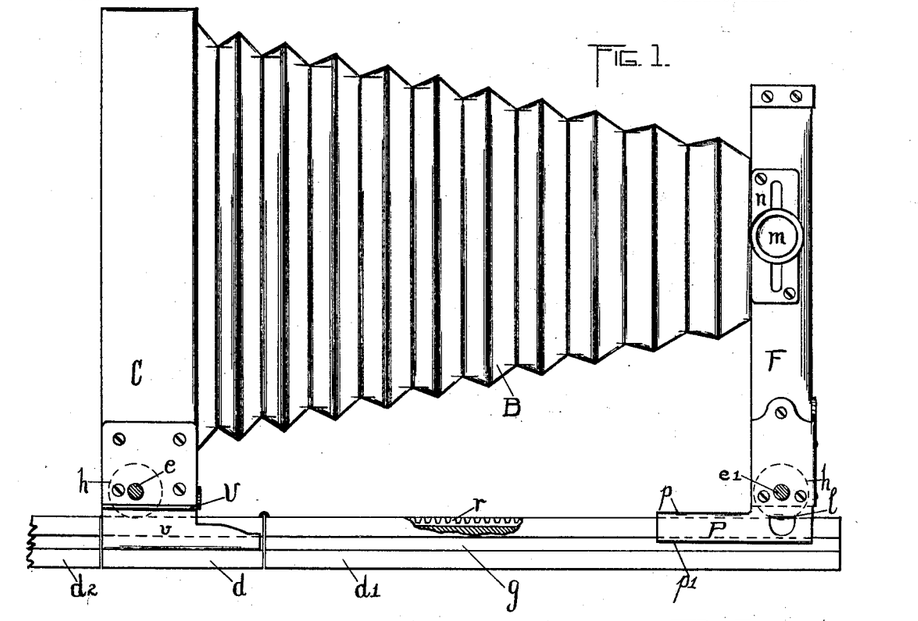
Figure 1 shows such a camera in side view with the bed opened out and with the lens-carriage moved outwardly upon the forward section of the bed. A portion of the bed is broken away to show the arrangement and location of one of the racks therein.
Figures 2, 3, 4, 5:
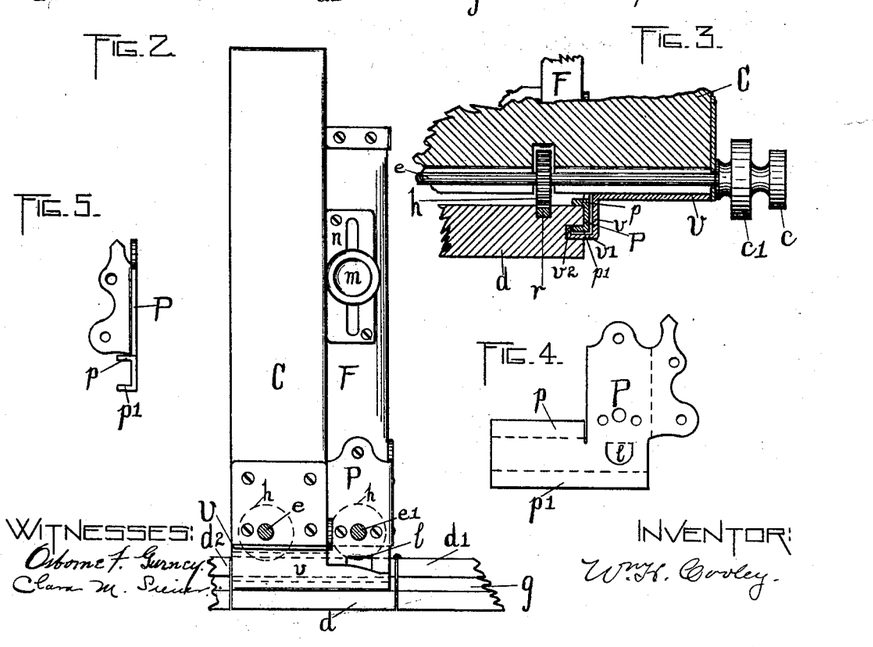
Figure 6:
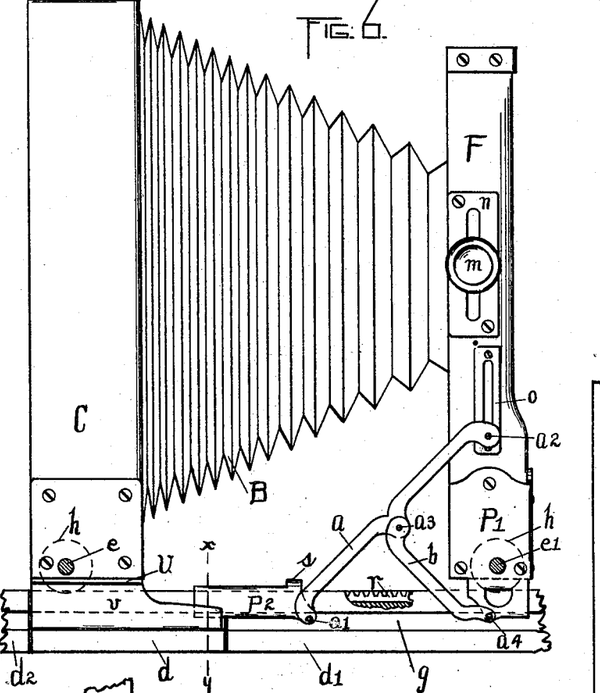
Figure 8:
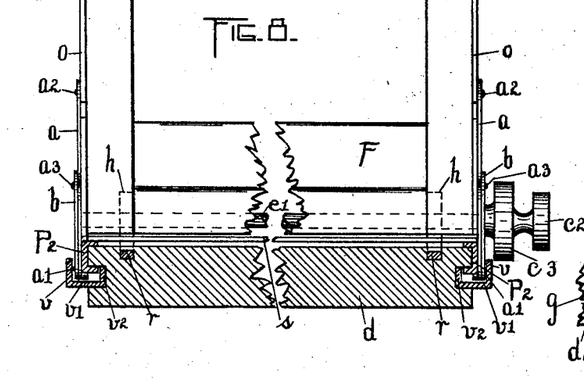
Fig. 8 is a sectional view of a part of the camera seen in Fig. 6 and taken along the dotted line $x\ y$ of Fig. 6 and all parts to the left thereof removed.

Referring to Figs. 1, 2, and 3 of the drawings, C is a camera-box having secured on the under side thereof, as indicated, brass foot-plates, the right-hand one only of which, V, is seen, consisting in a plate of brass, V, with its main portion horizontally disposed and secured to the under side of the camera-box and having a downward extension $v$ thereon, from which there extends a lateral projection inwardly and into the lens-carriage that is preferably to divide that portion of the foot-plates P engaging the bed and to provide mechanism whereby the divided parts thereof may be drawn together or removed from each other, and that, too, with such connections between them and the lens-carriage that the lens-standard of such carriage is always held in a vertical position. The mechanism for this purpose is shown in Figs. 6, 7, and 8, to which reference is now made. From each foot-plate P', of slightly-modified form, there is cut a portion $P^2$, such pieces or portions also being of course in pairs and connected together by means of a cross-piece, as seen at $s$ in Figs. 6 and 8.

Figure 7:
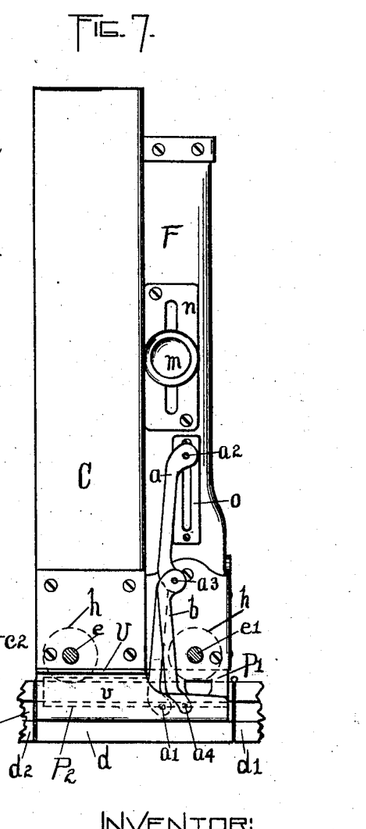

The construction and operation of the parts for each side of the camera being of course the same, I shall describe only those on the side toward the observer as seen in Fig. 6. With the lower right-hand corner of the part $P^2$ there is arranged to articulate the connecting-link $a$ on a pin or stud $a'$. The upper and right-hand end of this link $a$ articulates with a stud $a^2$, arranged to slide in the vertically-disposed groove in the guiding-plate $o$. A connecting-link $b$ articulates at its upper and left-hand end with the center of the lever on a stud $a^3$. This lever is curved, as indicated, and articulates at its right-hand end upon a pin or rivet $a^4$, projecting from the lower end of the plate P'. The pin $a^3$ is equally distant from the pin $a'$, the pin $a^4$, and the center of the stud $a^2$. The center of the stud $a^2$ is arranged to slide in a vertical line which, if extended, would pass through the pin $a^4$. The pins $a'$ and $a^4$ lie in a line parallel with the groove $g$ in the bed-pieces. The plates $P^2$ on each side of the camera are held in proper position, such as indicated in Figs. 6 and 8, by means of connecting-piece $s$. The construction just above described is such that no matter what distance apart the plates P' and $P^2$ may happen to be the standards of the lens-carriage F are retained in a vertical position. The combined length of the plates P' and $P^2$ upon the bed $d$ when such plates are brought close together is such as to be contained entirely upon the central section $d$ of the bed to the camera. When the plates P' and $P^2$ are separated as indicated in Fig. 6, it will be noticed that a greatly-increased length of bearing or guiding support is secured for the standards of the lens-carriage F over and above that which is provided when the plate P is in one piece, as is the case in the modification as shown in Figs. 1, 2, 3, 4, and 5. In other respects the operation of this modification of my camera is the same as that shown in such figures. In Fig. 7 there is seen a side view of this modification of my camera with the lens-carriage brought close up to the camera-box, the coöperating parts being shown also in their closed positions in this figure. There is shown at $m$ the operating-head and at $n$ the guide-plate for the usual mechanism for providing a rise-and-fall movement for the lens-board between the standards of the lens-carriage F, these parts being shown in Figs. 1, 2, 6, and 7.

Figure 9:
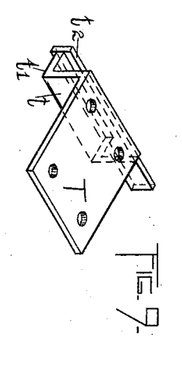
Figs. 9 and 10 show in perspective a modified form of foot or guide plate for the camera-box and for the lens-carriage, respectively.
Figure 10:
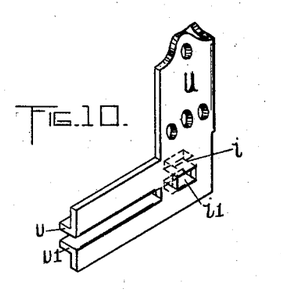
Figure 11:
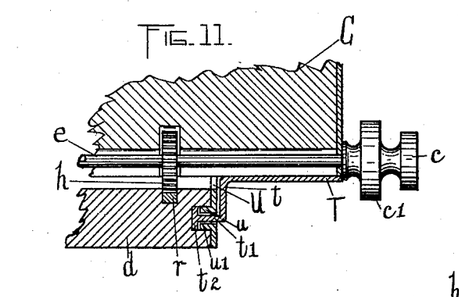
In Fig. 11 there is shown in a view similar to Fig. 3 a portion of a camera in which the elements thereof are supported by means of foot or guide plates such as seen in Figs. 9 and 10.
Figure 12:
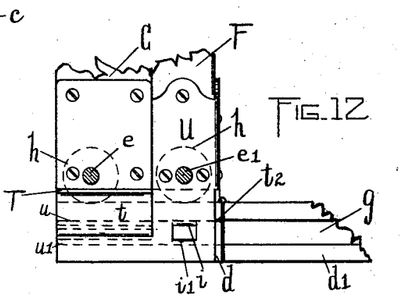

Referring to Figs. 9, 10, 11, and 12 in that modification of my invention therein shown, the foot-plate connected to the camera-box consists in a plate of brass, T, having the downward extension thereon, $t$, from which there projects laterally into the groove and preferably near the center thereof the horizontal projection $t'$, terminating in the plate $t^2$, which is arranged to lie in the bottom of the groove in the bed of the camera and to practically cover the width of such groove at its bottom. U is the foot or guide plate for the lens-carriage and has pressed inwardly from the bottom thereof near the right-hand corner the two lips $i$ and $i'$, the lips $i$ being shown only in dotted line. The portion of such plate U extending to the left or to the rear has pressed inwardly therefrom the two lips $u$ and $u'$ so proportioned and conformed that they fill practically the width of the groove in the camera-bed near its outer edge. So, also, is the case with the lips $i$ and $i'$. The vertical distances between these lips, however, is such as to freely admit of the passage between them of the lateral or horizontal projection $t'$, extending inwardly toward the camera-bed from the vertical extension $t$ on the plate T, secured to the camera-box. The plate $t^2$ on the plate T may be, as indicated in Fig. 9, considerably longer than the horizontal extension of the plate T lengthwise of the bed of the camera. The lips $u$ and $u'$ and $i$ and $i'$, it will at once be understood, constitute in their coöperation with their groove in the bed of the camera a sufficiently rigid and satisfactory support for the lens-carriage at any and all points of its adjustment longitudinally on the bed of the camera.

Figure 13:
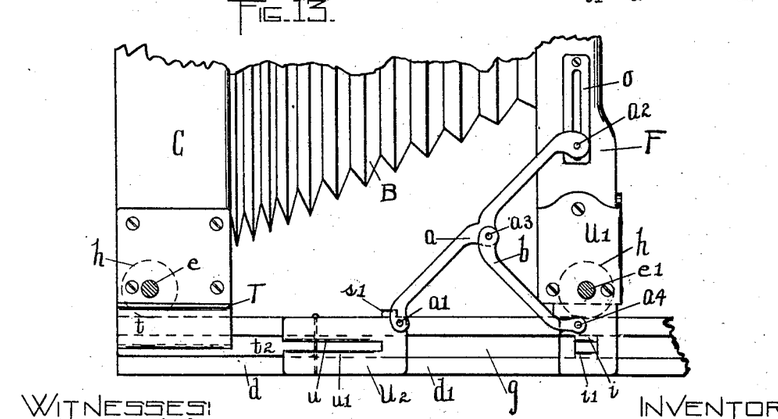
Fig. 13 shows in a view similar to Fig. 6 camera elements supported by guide-plates such as seen in Figs. 9 and 10, but with the guide-plate for supporting the lens-carriage divided and the parts of such plate so connected to each other and to the lens-carriage that the parts of such plate may be withdrawn from each other so as to increase the length of the horizontal bearing on the guideway of the support for the lens-standard.

Referring now to Fig. 13, when it is desired to increase the horizontal bearing of the foot or guide plate for the lens-carriage beyond the length of the central section of the bed of the camera, I make use of a modification of the just above described mechanism such as shown in Fig. 13. U' is a modified form of the plate for the lens-carriage, and U² is the detached or severed portion thereof, carrying the lips $u$ and $u'$ and connected to the corresponding one on the other side of the camera-bed by means of the cross-plate $s'$. The plate U' has the lips $i$ and $i'$ formed therefrom similar to the plate U. Connecting-links $a$ and $b$ operate upon studs and pins $a'$, $a^2$, $a^3$, and $a^4$ in a manner exactly similar to that already described with reference to that modification of my invention described in reference to and shown in Figs. 6 and 7, and the parts are arranged, it will at once be understood, to close up in the manner similar to that shown in Fig. 7.

Figure 14:
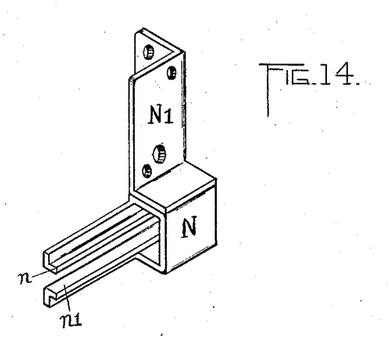
Figs. 14 and 15 show in views similar to Figs. 10 and 9, respectively, modified forms of guide-plates arranged to work upon a guideway consisting in a tongue or ridge projecting outwardly from the camera-bed.
Figure 15:
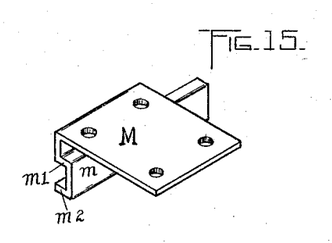
Figure 16:
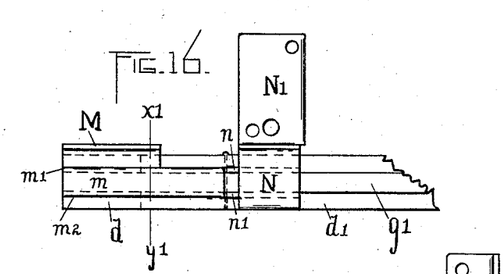
Figure 17:
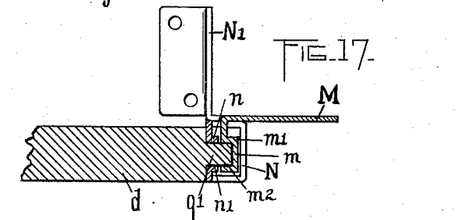
Fig. 17 is a sectional view of a part of a camera-bed having such guide-plates working on the guideway thereon and taken along the line $x'y'$ of Fig. 16.

Refer now to Figs. 14, 15, 16, and 17. In Fig. 14 there is shown a modified form of guide-plate for the lens-carriage, consisting in two parts N and N', secured together, and from the back side of the part N there extend outwardly two laterally-projecting lips $n$ and $n'$. The engagement of this foot-plate for the lens-carriage with a projecting tongue $g'$ on the edge of the camera-bed $d$ is clearly indicated in Fig. 17. In Fig. 15 there is shown a plate M, having formed on the downward extension thereon the three sides $m'$, $m$, and $m^2$ of a channel-piece which is arranged to work upon the outer edge of the tongue $g'$ on the bed $d$, as seen in Fig. 17. In Fig. 16 there is shown the relative positions of these guide-plates when partially overlapping each other. The plate M may have the grooved or channeled portion thereon, consisting of the sections $m'$, $m$, and $m^2$, extending on the tongue $g'$ of the bed $d$ forward of and beyond the main body of the plate M, and so as to enter within the right-hand end of the portion N of the foot or guide plate for the lens-carriage.

I will now describe those features of my present invention which pertain more especially to the stiffening of the bed, in connection with which, however, I will show and describe that modification of my invention already described in reference to Figs. 1, 2, 3, 4, and 5.

Figures 18, 21:
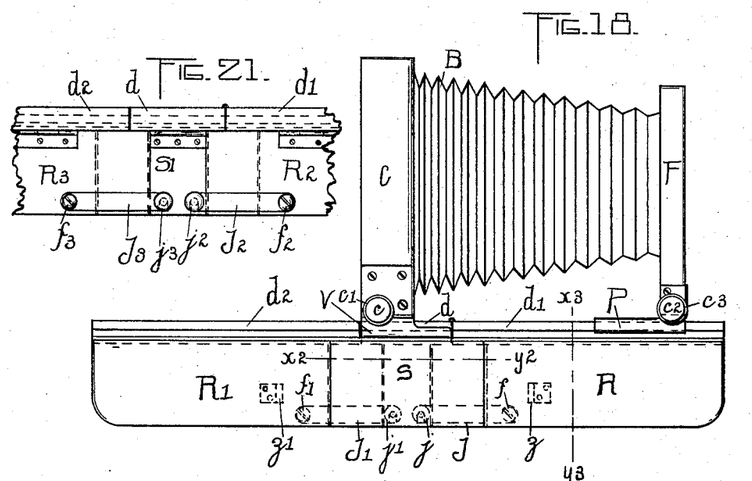
Fig. 18 is a side view of a camera embodying that modification of my invention shown in Figs. 1, 2, 3, 4, and 5 and combined therewith the additional features especially adapted to the larger sizes and heavier cameras consisting in the folding-bed braces.
Fig. 21 is a partial view of the three sections of the bed $d$, $d'$, and $d^2$ and with the bracing-pieces toward the observer removed so as to show an inside view of the bracing-pieces on the farther side of the camera-bed.
Figure 19:
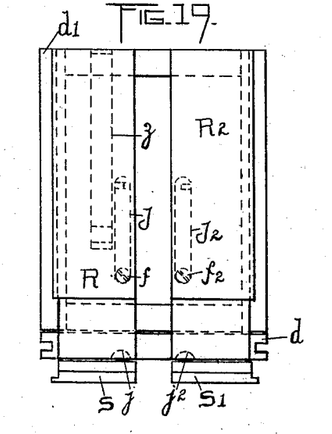
Fig. 19 shows the portion of the bed $d$ with the braces or stiffening-pieces thereto attached in their folded-up positions and also with the section of the bed-piece $d'$ folded up vertically on such bed-piece $d$ and with the bracing or stiffening pieces thereto attached, also in their folded-up positions.
Figure 22:
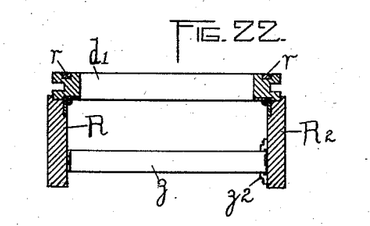
Fig. 22 is a vertical sectional view of the bed $d'$, taken along the dotted line $x^3 y^3$ of Fig. 18, and shows the bracing-pieces attached thereto in their operative positions and also the means for connecting such bracing-pieces together, operating to stiffen the camera-bed so as to prevent its being deflected or bent downwardly at the middle when supported only from the ends and preventing either end from being raised upwardly out of the normal plane of the camera-bed, while the abutting ends of the several bracing-pieces on each side of the camera-bed when opened out and in operative position operate to prevent the extreme ends of the camera-bed from being deflected or bent downwardly out of the normal plane of the camera-bed.

Referring to Figs. 18, 19, 20, 21, and 22, to the central section of the bed $d$ there are hinged the two pieces S and S', arranged when out of use to fold up, as indicated in Fig. 19, in a plane parallel with the bed-piece $d$. To the bed-piece $d'$ there are similarly hinged the pieces R and R², also arranged when folded up to lie in a plane parallel with the section of bed $d'$. To the section of bed $d^2$ there are similarly hinged the pieces R' and R³, also arranged when out of use to be folded up and lie in a plane parallel with the section of bed $d^2$. (Refer to Fig. 22.) The bracing-pieces R and R² are arranged to be held in their operative positions by means of the hinged cross-piece $z$ articulating with the piece R and arranged to engage and hook into the cross-bar $z^2$, supported from the brace-piece R², as indicated in Figs. 19 and 22, to hold the pieces R and R² in their proper operative positions. Similarly, the pieces R' and R³ are held in their operative positions by means of a cross-piece $z'$, the position of which is indicated in dotted lines in Fig. 18, in which figure also the position of the cross-piece $z$ is similarly indicated.

Figure 20:
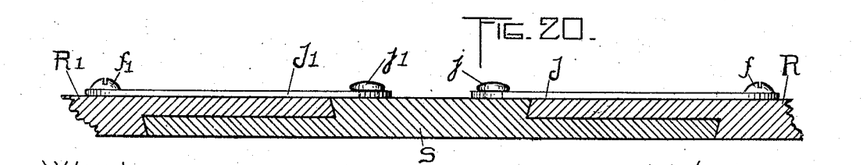
Fig. 20 is a horizontal sectional view of the central portion of that series of bracing or supporting pieces for the three sections of the bed of the camera located on the side toward the observer in Fig. 18, taken along the dotted line $x^2 y^2$ of Fig. 18, and with all parts above such line removed.

Refer now to Figs. 20 and 21. The hook J swings upon a screw $f$, secured in the bracing-piece R, and engages a screw-stud $j$, secured in the bracing-piece S in such a way as to firmly hold such pieces together in the positions indicated in Figs. 18 and 20. Upon a similar screw $f'$ the hook $J'$ articulates and is arranged to engage the screw-stud $j''$, also secured in the bracing-piece S. Similar hooks $J^2$ and $J^3$ are arranged to connect, respectively, the bracing-pieces $R^2$ and $R^3$ with the bracing-piece $S'$ on the farther side of the camera-bed, as indicated in Fig. 21. The position of the hooks J and $J'$ and their connecting parts is indicated in dotted lines in Fig. 10. Attention is called to the fact that the bracing-pieces on each side of the camera when turned down to occupy their operative positions and connected together by means of the hooks J, $J'$, $J^2$, and $J^3$ constitute a truss-like construction at each edge of the camera-bed, preventing the flexion or bending of the camera-bed downwardly at the center and upwardly at either end and also preventing a flexion of the camera-bed in the opposite direction, serving thus to stiffen the entire construction, so that the camera-bed is rendered thereby very rigid and prevented from bending under the weight of the lens and lens-tube, which are sometimes quite heavy, as oftentimes for fine work a photographer will require a lens normally made for a plate several sizes larger than the camera will hold. In such cases the lens is oftentimes of sufficient weight to even break the ordinary camera-bed apart at the joints or hinges. With this construction, then, the camera can be folded up into practically the same space required for the ordinary view-camera with folding bed, and with these bracing-pieces attached the camera-bed becomes sufficiently rigid for view work or for studio or gallery work and also with the heaviest lenses that may be called for. Attention is also called to the fact that a material strengthening at the joints of the camera-bed is secured by reason of the fact that the bracing-pieces of any one section overlap and lie under the adjacent section of the camera-bed, thus overlapping the joints between adjacent sections.

Attention is especially called to the fact that the other features of my present invention pertain all of them especially to the securing in connection with the desired and maximum degree of compactness of the camera when folded up that degree of rigidity of the camera elements upon the camera-bed and also that degree of rigidity of the camera-bed itself which will overcome the difficulties usually found in such constructions heretofore in that the deflection of the lens-carriage from its normal position at right angles with the bed oftentimes places the focus of the lens without the possible range of the rise-and-fall movement of the lens-board to compensate therefor and also overcoming the further difficulty attendant upon the springing of the bed, oftentimes rendering it next to impossible to properly focus the picture upon the ground-glass plate and also resulting in a blurring or lack of definition in the picture, resulting from the tendency of the bed itself to spring and vibrate if even slightly jarred. This springing or vibrating causes a wide variation in the focus on the ground-glass plate, inasmuch as the bed itself oftentimes springs in and of itself.

The whole purpose, then, of my invention consists in providing means for increasing the rigidity of the parts of the camera, lens-carriage, and camera-box relatively to each other and also upon the bed itself, as well as in the bed carrying such elements.

The operation of a camera when embodying my invention and in the different modifications thereof herein shown is believed to be sufficiently obvious from the description already given and from the drawings to call for no further description thereof herein.

I have shown the bracing-pieces for the bed of a camera as applied to a sectional bed of the construction usual to folding-bed view-cameras. I, however, do not limit myself to any style of connection between the sections of the bed, as obviously without departing from the spirit of this feature of my present invention such bracing or stiffening pieces may be applied to cameras having different styles of sectional beds. Indeed, in the usual view-camera with folding bed the rear section is detachable by the removal of a screw-bolt. The particular method of securing the rear section of the bed to the central section forming no feature of my present invention and being variously modified to suit the tastes of the individual manufacturer or user, no illustration of such method of attachment is herein shown or described.

What I claim is—

1. In a camera, a bed having a guideway thereon, a camera-box having a guide-plate connected thereto and arranged to slide on such guideway, a lens-carriage having a guide-plate connected thereto and arranged to slide on such guideway, such guide-plates so conformed relatively to each other and to such guideway that each is caused thereby to traverse a practically fixed path and that each of such guide-plates may overlap or pass partially by the other when the elements to which they are connected are brought close together.

2. In a camera, a bed having a guideway thereon, two camera elements arranged to slide independently on such bed, guide-plates connected to such elements and arranged to work on such guideway and means for causing one of such guide-plates to work in a fixed path in engagement with one surface of such guideway and out of the path thereon for the guide-plate on such other element.

3. In a camera, a bed having a guideway thereon, two camera elements arranged to slide independently on such bed, guide-plates on such elements for engaging such guideway, such guide-plates conformed to engage such guideway on such bed and to work thereon in independent paths and to partially pass by or overlap each other when the elements to which they are connected are brought close together.

4. In a camera, a bed having a guideway thereon, two camera elements arranged to slide independently on such bed, guide-plates on such elements for engaging such guideway, such guide-plates conformed to engage such guideway on such bed and to work thereon in independent paths and to partially pass by or overlap each other on such guideway where they extend beyond the elements to which they are respectively connected.

5. In a camera, a bed having a guideway thereon, two camera elements slidable independently on such bed, guide-plates on such elements for engaging such guideway and means for causing each of such guide-plates to work in a practically fixed and independent path on such guideway whereby such guide-plates may overlap or pass by each other on such guideway.

6. In a camera, a bed having a pair of guideways thereon, a camera-box having a pair of guide-plates connected thereto and arranged to slide one on each of such guideways, a lens-carriage having a pair of guide-plates connected thereto and arranged to slide one on each of such guideways, such guide-plates so conformed relatively to each other and to such guideways that corresponding guide-plates connected to each of such elements are caused thereby to traverse practically fixed paths and that each of such corresponding guide-plates may overlap or pass by the other when the elements to which they are connected are brought close together.

7. In a camera, a bed having a pair of guideways thereon, two camera elements arranged to slide independently on such bed, two guide-plates connected to each of such elements and arranged to work on such guideways, means for causing the guide-plates on one of such elements to work in fixed paths in engagement with each of such guideways and out of the paths thereon for the corresponding guide-plates on such other element.

8. In a camera, a bed having two guideways thereon, two camera elements arranged to slide independently on such bed, two guide-plates on each of such elements for engaging such guideways, corresponding guide-plates on each of such elements conformed to engage such guideways on such bed and to work thereon in independent paths and to partially pass by or overlap each other when the elements to which they are connected are brought close together.

9. In a camera, a bed having two guideways thereon, two camera elements arranged to slide independently on such bed, guide-plates on such elements for engaging such guideways, corresponding guide-plates on such elements conformed to engage such guideways on such bed and to work thereon in independent paths and to partially pass by or overlap each other on such guideways where they extend beyond the elements to which they are respectively connected.

10. In a camera, a bed having two guideways thereon, two camera elements slidable independently on such bed, guide-plates on such elements for engaging such guideways and means for causing a guide-plate on each of such elements engaging the same guideway to work in practically fixed and independent paths on such guideway, whereby such guide-plates may overlap or pass by each other on such guideway.

11. In a camera, in combination with two sections of the bed thereof, bracing or stiffening pieces for such bed arranged when in their operative positions to lie in planes at right angles or nearly so with the planes of the sections of such bed and arranged also to be folded up on the under sides of the sections of such bed, and in planes practically parallel with the planes of the sections of such bed.

12. In a camera, in combination with two sections of the bed thereof, bracing or stiffening pieces for such bed arranged in their operative positions to lie in planes at right angles or nearly so with the planes of the sections of such bed and arranged also to be folded up on the under sides of the sections of such bed, and in planes practically parallel with the planes of the sections of such bed, a bracing-piece for one section of such bed arranged to extend beyond such section and partially under an adjacent section of such bed thereby overlapping the joint between such adjacent sections of the bed.

13. In a camera, in combination with two sections of the bed thereof, bracing or stiffening pieces for such bed arranged in their operative positions to lie in planes at right angles or nearly so with the planes of the sections of such bed and arranged also to be folded up on the under sides of the sections of such bed and in planes practically parallel with the planes of the section of such bed, and means for holding such bracing-pieces on the sections of such bed in their operative positions.

14. In a camera, in combination with two sections of the bed thereof, bracing or stiffening pieces for such bed arranged in their operative positions to lie in planes at right angles or nearly so with the planes of the sections of such bed and arranged also to be folded up on the under side of the sections of such bed and in planes practically parallel with the planes of the sections of such bed, and means for securing together the bracing-pieces on adjacent sections of such bed at or near their lower edges.

15. In a camera, in combination with two sections of the bed thereof, bracing or stiffening pieces for such bed arranged in their operative positions to lie in planes at right angles or nearly so with the planes of the sections of such bed and arranged also to be folded up on the under sides of the sections of such bed and in planes practically parallel with the planes of the section of such bed, a bracing-piece for one section of such bed arranged to extend beyond such section and partially under an adjacent section of such bed thereby overlapping the joint between such adjacent sections of the bed, and means for securing together the bracing-pieces on adjacent sections of such bed at or near their lower edges.

16. In a camera having a bed in two or more sections, bracing-pieces for the sections of such bed, connections between adjacent sections of such bed, between the sections of such bed and their corresponding bracing-pieces and between the bracing-pieces for adjacent sections of such bed, whereby such bed when opened out with such bracing-pieces in operative position constitutes a truss in which each of such elements sustains both a tension and longitudinal thrust opposing any tendency to bend such combined system of bed-sections and bracing-pieces.

17. In a camera a bed having a guideway thereon, a camera element arranged to slide on such bed, two guides for engaging such guideway, connections between such guides whereby such guides may be advanced to and from each other and connections between such guides and such camera element for maintaining a practically fixed angular relation between such camera element and the plane of such guideway.

18. In a camera, a bed having a guideway thereon, a camera element arranged to slide on such bed, two guides for engaging such guideway, connections between such guides whereby such guides may be advanced to and from each other and connections between such guides and such camera element for maintaining a practically fixed angular relation between such camera element and the plane of such guideway, and a second camera element having a guide thereon also arranged to engage such guideway and to overlap or pass by one of the guides connected to such first-named camera element when such camera elements are brought close together.

19. In a camera, a bed having a guideway thereon, a camera element arranged to slide on such bed, two guides for engaging such guideway, one of such guides movable relatively to such camera element, connections between such guides whereby such guides may be advanced to and from each other and connections between such movable guide and such camera element for maintaining a fixed angular relation between such camera element and the plane of such guideway.

20. In a camera, a bed having a guideway thereon, a camera element arranged to slide on such bed, two guides for engaging such guideway, one of such guides movable relatively to such camera element, connections between such guides whereby such guides may be advanced to and from each other and connections between such movable guides and such camera element for maintaining a fixed angular relation between such camera element and the plane of such guideway, and a second camera element having a guide thereon also arranged to engage such guideway and to overlap or pass by one of the guides connected to such first-named camera element when such camera elements are brought close together.

21. In a camera, a bed having a guideway thereon, a camera element arranged to slide on such bed, two guides arranged to engage such guideway, connections between such guides whereby they may be advanced relatively to and from each other on such guideway and connections between such guides and such camera element for maintaining a practically fixed angular relation between such camera element and the plane of such guideway.

22. In a camera, a bed having a guideway thereon, a camera element arranged to slide on such bed, two guides arranged to engage such guideway, connections between such guides whereby they may be advanced relatively to and from each other on such guideway and connections between such guides and such camera element for maintaining a practically fixed angular relation between such camera element and the plane of such guideway, and a second camera element having a guide thereon also arranged to engage such guideway and to overlap or pass by one of the guides connected to such first-named camera element when such camera elements are brought close together.

WM. H. COOLEY.

Witnesses:
 OSBORNE F. GURNEY,
 CLARA M. SIENER.